(12) United States Patent
Takahashi et al.

(10) Patent No.: US 10,610,893 B2
(45) Date of Patent: Apr. 7, 2020

(54) VIBRATION ACTUATOR AND PORTABLE DEVICE

(71) Applicants: Yuki Takahashi, Tokyo (JP); Kazutaka Sakaguchi, Tokyo (JP); Yasutaka Kitamura, Tokyo (JP); Shigeyuki Shimomura, Tokyo (JP); Yuki Ogihara, Tokyo (JP)

(72) Inventors: Yuki Takahashi, Tokyo (JP); Kazutaka Sakaguchi, Tokyo (JP); Yasutaka Kitamura, Tokyo (JP); Shigeyuki Shimomura, Tokyo (JP); Yuki Ogihara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/194,415

(22) Filed: Nov. 19, 2018

(65) Prior Publication Data

US 2019/0151895 A1 May 23, 2019

(30) Foreign Application Priority Data

Nov. 17, 2017 (JP) .................................. 2017-222020

(51) Int. Cl.
| | |
|---|---|
| *H02K 7/06* | (2006.01) |
| *B06B 1/04* | (2006.01) |
| *H02K 33/18* | (2006.01) |
| *H02K 33/16* | (2006.01) |
| *H04M 19/04* | (2006.01) |

(52) U.S. Cl.
CPC ............. *B06B 1/045* (2013.01); *H02K 33/18* (2013.01); *B06B 2201/53* (2013.01); *H02K 33/16* (2013.01); *H04M 19/047* (2013.01)

(58) Field of Classification Search
CPC ........ H02K 33/16; H02K 33/18; H02K 33/00; H02K 33/02; H02K 1/34
USPC .......................................... 310/15, 25, 27, 81
See application file for complete search history.

(56) References Cited

U.S. PATENT DOCUMENTS

| | | | |
|---|---|---|---|
| 9,666,348 B2 * | 5/2017 | Odajima | ................... H01F 7/10 |
| 2011/0101796 A1 | 5/2011 | Odajima et al. | |
| 2011/0241451 A1 * | 10/2011 | Park | ........................ B06B 1/045 |
| | | | 310/25 |

(Continued)

FOREIGN PATENT DOCUMENTS

| | | |
|---|---|---|
| JP | 4875133 B2 | 12/2011 |
| JP | 2015-095943 A | 5/2015 |
| JP | 2015-112013 A | 6/2015 |

*Primary Examiner* — Thanh Lam
(74) *Attorney, Agent, or Firm* — Brundidge & Stanger, P.C.

(57) ABSTRACT

A vibration actuator includes: a movable part including a coil or a magnet; a fixing part including the other one of the coil or the magnet; and an elastic supporting part supporting the movable part such that the movable part is movable to the fixing part. The movable part reciprocates with respect to the fixing part in a vibrating direction by interaction between the coil and the magnet. The magnet is disposed to be radially inwardly spaced apart from the coil. The elastic supporting part is fixed at its one end to the fixing part and at its other end to the movable part. The elastic supporting part has a structure for cantilevering the movable part. The coil in a state of being fixed to a resin coil holder is integrated in the movable part or the fixing part.

7 Claims, 11 Drawing Sheets

(56) References Cited

U.S. PATENT DOCUMENTS

| | | | |
|---|---|---|---|
| 2012/0169150 A1* | 7/2012 | Lee | B06B 1/045 |
| | | | 310/25 |
| 2014/0152126 A1* | 6/2014 | Kim | B06B 1/045 |
| | | | 310/25 |
| 2015/0137627 A1 | 5/2015 | Katada et al. | |
| 2015/0214822 A1* | 7/2015 | Kim | H02K 33/18 |
| | | | 310/25 |
| 2019/0151894 A1* | 5/2019 | Takahashi | B06B 1/045 |
| 2019/0151896 A1* | 5/2019 | Takahashi | H04M 1/026 |
| 2019/0207496 A1* | 7/2019 | Takahashi | G06F 3/016 |
| 2019/0304650 A1* | 10/2019 | Takahashi | G06F 3/016 |

* cited by examiner

VIBRATION ACTUATOR AND PORTABLE DEVICE

CROSS REFERENCE TO RELATED APPLICATIONS

This application is entitled to and claims the benefit of Japanese Patent Application No. 2017-222020, filed on Nov. 17, 2017 and the disclosure of which including the specification, drawings and abstract is incorporated herein by reference in its entirety.

TECHNICAL FIELD

The present invention relates to a vibration actuator and a portable device.

BACKGROUND ART

Conventionally, a vibration actuator has been mounted as a vibration source in portable devices having a vibrating function. It is possible to notify a user of an incoming call and to improve an operational feeling and/or realism by driving the vibration actuator to transmit vibration to the user. Here, the "portable devices" include portable communication terminals such as mobile phones and smartphones, personal digital assistants such as tablet PCs, portable game terminals, a controller (game pad) of stationary game machines, and wearable terminals to be worn on clothes and/or a wrist.

Vibration actuators disclosed in Patent Literature (hereinafter, referred to as "PTL") 1 (Japanese Patent Application Laid-Open No. 2015-095943), PTL 2 (Japanese Patent Application Laid-Open No. 2015-112013), and PTL 3 (Japanese Patent No. 4875133) include a fixing part including a coil, and a movable part including a magnet, and in such vibration actuators, vibration is generated by utilizing a driving force of a voice coil motor composed of the coil and the magnet to cause the movable part to reciprocate. Each of these vibration actuators is a linear actuator in which the movable part moves in a straight line along a shaft, and is mounted such that the vibrating direction is parallel to the main face of a portable device. Vibration in the direction along the body surface of a user is transmitted to the body surface being in contact with the portable device.

SUMMARY OF INVENTION

Technical Problem

Portable devices having a vibrating function are required to be able to give sufficient physically-felt vibration to a user. However, since the vibration actuators disclosed in PTLs 1 to 3 generate vibration in the direction along the body surface, it is possible that these vibration actuators cannot give sufficient physically-felt vibration.

An object of the present invention is to provide a vibration actuator and a portable device which can give sufficient physically-felt vibration without enlargement of the vibration actuator or portable device.

Solution to Problem

A vibration actuator according to the present invention includes: a movable part including one of a coil or a magnet; a fixing part including the other one of the coil or the magnet; and an elastic supporting part configured to support the movable part such that the movable part is movable to the fixing part, the movable part being configured to reciprocate with respect to the fixing part in a vibrating direction by interaction between the coil and the magnet. In the vibration actuator, the magnet is disposed to be radially inwardly spaced apart from the coil, the elastic supporting part is fixed to the fixing part at one end of the elastic supporting part and to the movable part at the other end of the elastic supporting part, the elastic supporting part has a structure for cantilevering the movable part, and the coil in a state of being fixed to a resin coil holder is integrated in the movable part or the fixing part.

A portable device according to the present invention is a portable device in which the aforementioned vibration actuator is mounted.

DESCRIPTION OF EMBODIMENTS

Hereinafter, an embodiment of the present invention will be described in detail with reference to the accompanying drawings.

Figure 1:
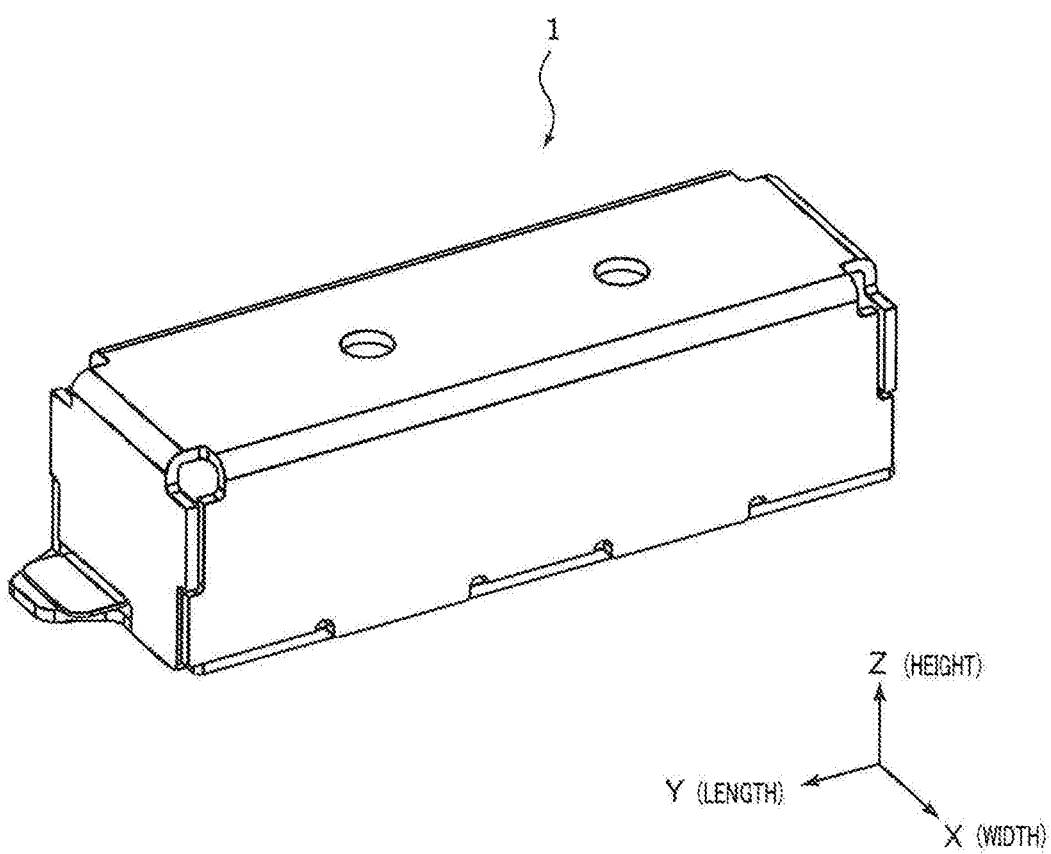
FIG. 1 is a perspective view of an external appearance of a vibration actuator according to one embodiment of the present invention.
Figure 2:
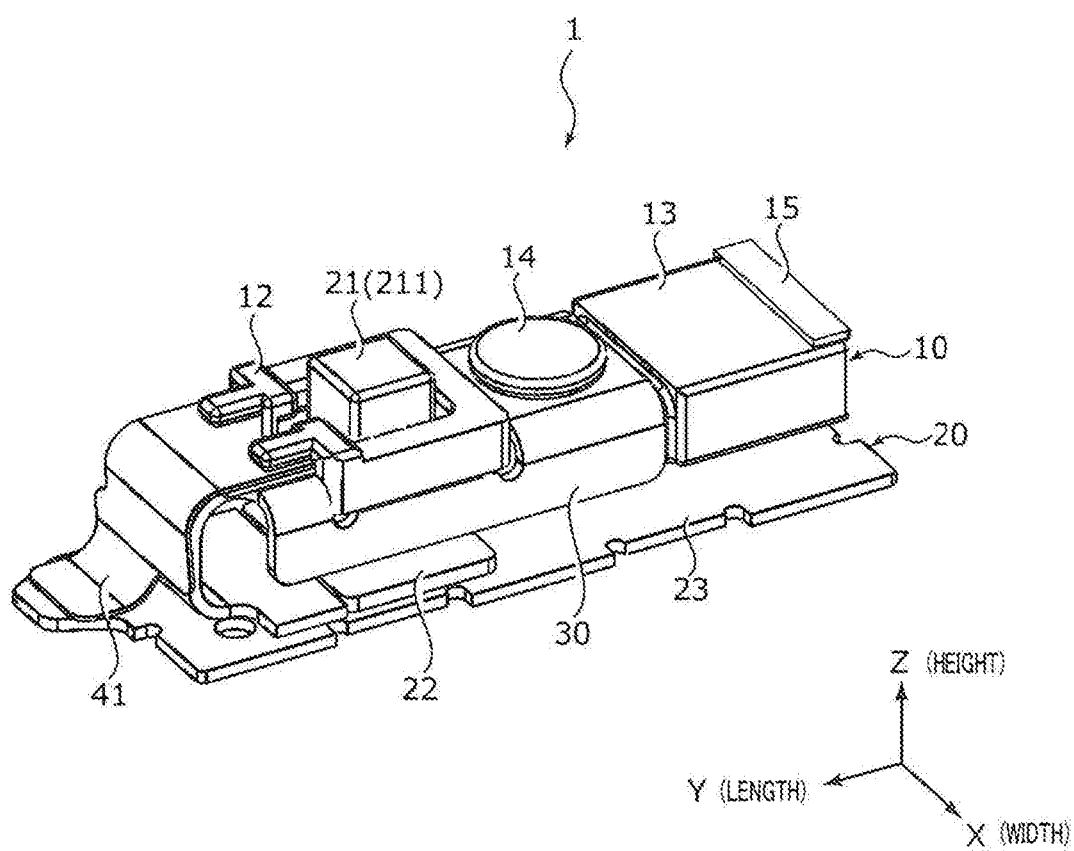
FIG. 2 is a perspective view of the vibration actuator from which its cover is removed.
Figure 3:
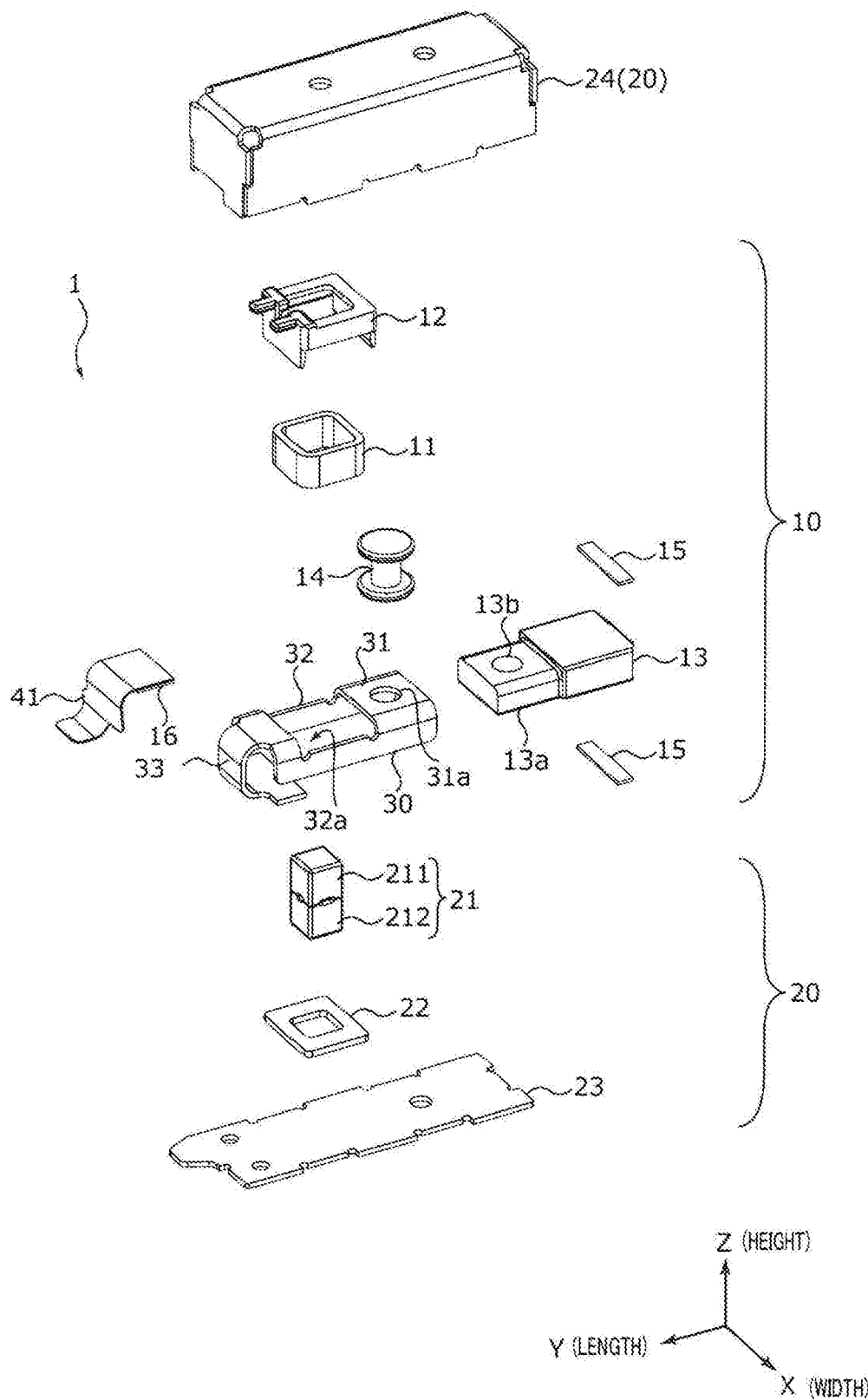
FIG. 3 is an exploded perspective view of the vibration actuator.
Figure 4:
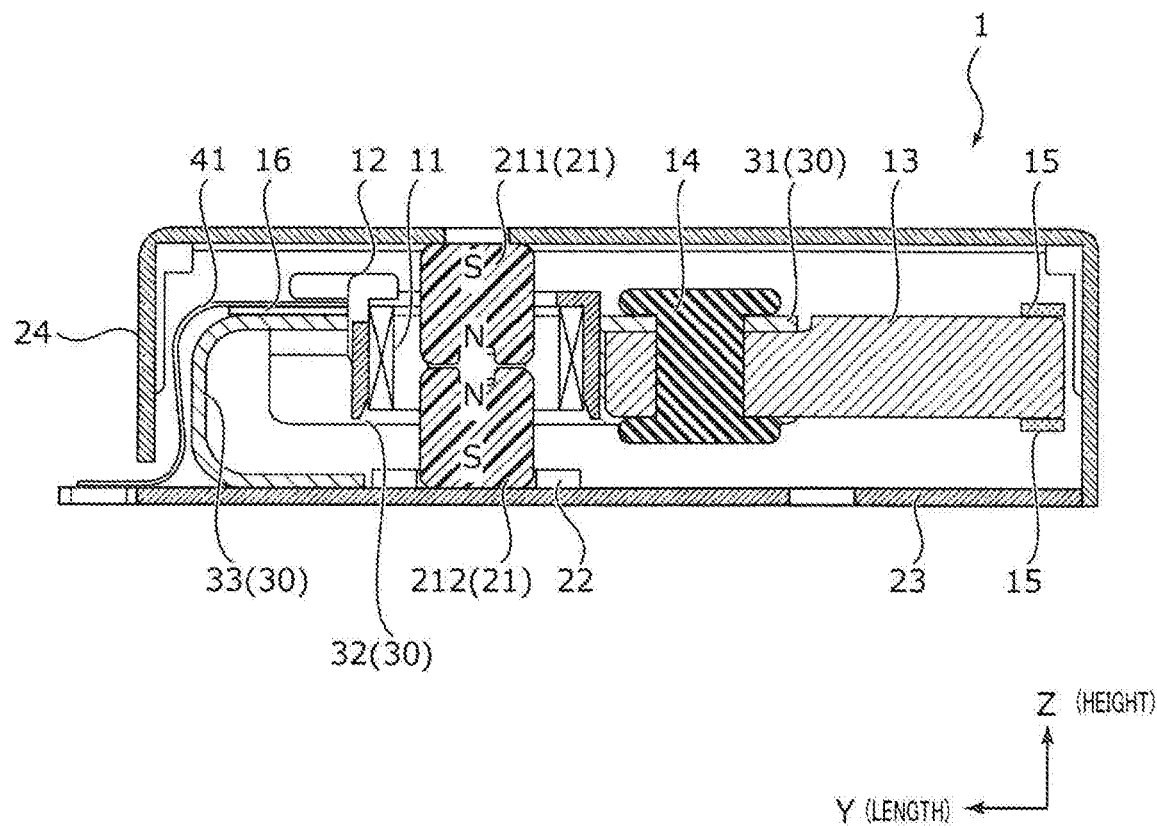
FIG. 4 is a longitudinal sectional view of principal parts of the vibration actuator.

FIG. 1 is a perspective view of an external appearance of vibration actuator 1 according to one embodiment of the present invention. FIG. 2 is a perspective view of vibration actuator 1 from which its cover 24 is removed. FIG. 3 is an exploded perspective view of vibration actuator 1. FIG. 4 is a longitudinal sectional view of principal parts of vibration actuator 1.

Descriptions will be given of the embodiment of the present invention with an orthogonal coordinate system (X, Y, Z). The same orthogonal coordinate system (X, Y, Z) is also used for illustration of below-mentioned figures. Hereinbelow, the width, length, and height of vibration actuator 1 are lengths in X-direction, Y-direction, and Z-direction, respectively. In addition, in the descriptions, the "upper side" and "the lower side" are the plus side and the minus side in the Z-direction, respectively.

Vibration actuator 1 is mounted as a vibration source in a portable device, such as a smartphone (see FIGS. 11A and 11B), and implements a vibrating function of the portable device. Vibration actuator 1 is driven, for example, for notifying a user of an incoming call, and giving the user an operational feeling and/or realism. Vibration actuator 1 is mounted such that the XY face is parallel to the main face of the portable device, for example. The main face of the portable device is a vibration transmitting surface coming into contact with the user, e.g., in the case of a smartphone or a tablet terminal, its touch panel face corresponds to the main face.

As illustrated in FIGS. 1 to 4, vibration actuator 1 includes movable part 10, fixing part 20, and elastic supporting body 30. Movable part 10 is joined to fixing part 20 via elastic supporting body 30 such that one end of movable part 10 serves as a fulcrum for the other end of movable part 10 to reciprocate.

Movable part 10 is a part that vibrates (oscillates) when vibration actuator 1 is driven. Fixing part 20 is a part for supporting movable part 10 via elastic supporting body 30. In the embodiment of the present invention, movable part 10 includes coil 11 and fixing part 20 includes magnet 21. That is, a voice coil motor (VCM) of a moving-coil system is employed in vibration actuator 1. Note that, a voice coil motor of a moving-magnet system in which movable part 10 includes a magnet and fixing part 20 includes a coil may also be applicable in vibration actuator 1.

Elastic supporting body 30 includes weight connecting part 31, coil-holder housing 32, and plate spring part 33. Weight connecting part 31, coil-holder housing 32, and plate spring part 33 are integrally formed by sheet metal processing of a stainless steel plate, for example. Note that, plate spring part 33 deforms when vibration actuator 1 is driven, and accordingly, weight connecting part 31 and coil-holder housing 32 vibrate integrally along with coil 11, weight 13, and the like. That is, weight connecting part 31 and coil-holder housing 32 are parts of movable part 10.

Note that, weight connecting part 31, coil-holder housing 32, and plate spring part 33 may be formed from respective separate members, or adjacent two of them may be formed integrally and remaining one of them from a separate member.

As seen in the Y-direction, weight connecting part 31 and coil-holder housing 32 as a whole has the shape of the letter U which is open on the lower side. Plate spring part 33 as seen in the X-direction has the shape of the letter U which is open on the lateral side.

Weight connecting part 31 is a part to which weight 13 is connected. The shape of weight connecting part 31 is such that weight connecting part 31 covers, with its upper and side surfaces, elastic-body connecting part 13a of weight 13. Weight connecting part 31 includes, in its upper surface, rivet hole (through hole) 31a into which rivet 14 serving as a fixing member is inserted. Weight connecting part 31 is connected to weight 13 by rivet 14. The connecting structure between weight 13 and elastic supporting body 30 is described below.

Coil-holder housing 32 is a part for housing coil holder 12. The upper surface of coil-holder housing 32 is cut out, and opening 32a for housing coil holder 12 is formed in the cut out portion. Coil holder 12 is fixed, e.g., adhesively to the inside surface of coil-holder housing 32.

Plate spring part 33 is a platelike part which deforms when vibration actuator 1 is driven. One end of plate spring part 33 is fixed to fixing part 20 (base plate 23) by welding or adhesion, for example. The other end of plate spring part 33 is connected both to coil 11 attached to coil-holder housing 32 and to weight 13 attached to weight connecting part 31.

One end of movable part 10 (in this embodiment, an end of coil-holder housing 32 on the side of plate spring part 33) is joined to base plate 23 of fixing part 20 via plate spring part 33, and the other end is a free end. Movable part 10 is disposed inside a case intermediately between base plate 23 and the upper surface of cover 24 in such a manner as to be cantilevered substantially parallel to base plate 23 and to the upper surface of cover 24. That is, elastic supporting body 30 has a structure for cantilevering movable part 10 such that movable part 10 is movable in the vibrating direction (Z-direction).

Movable part 10 includes coil 11, coil holder 12, and weight 13. Note that, as described above, weight connecting part 31 and coil-holder housing 32 of elastic supporting body 30 are also parts of movable part 10 in the present embodiment.

Figure 10A:
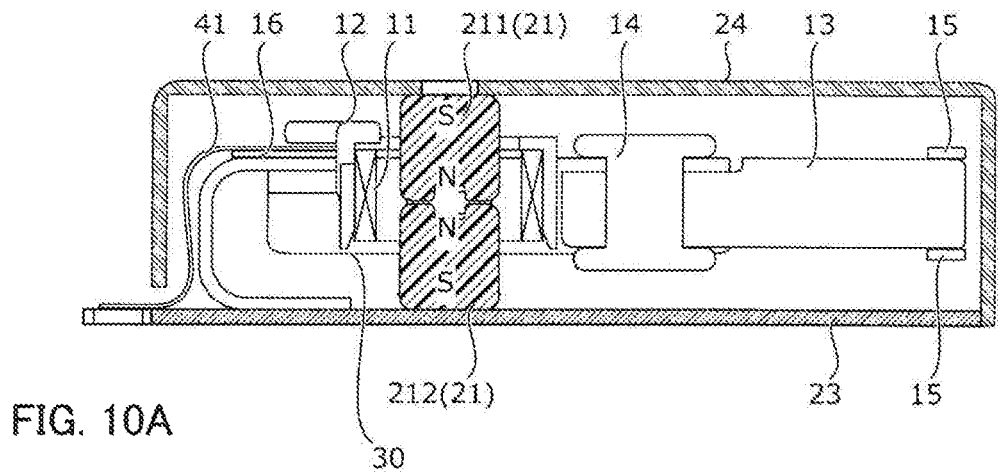
FIGS. 10A to 10C are longitudinal sectional views illustrating operation of a movable part.
Figure 10B:
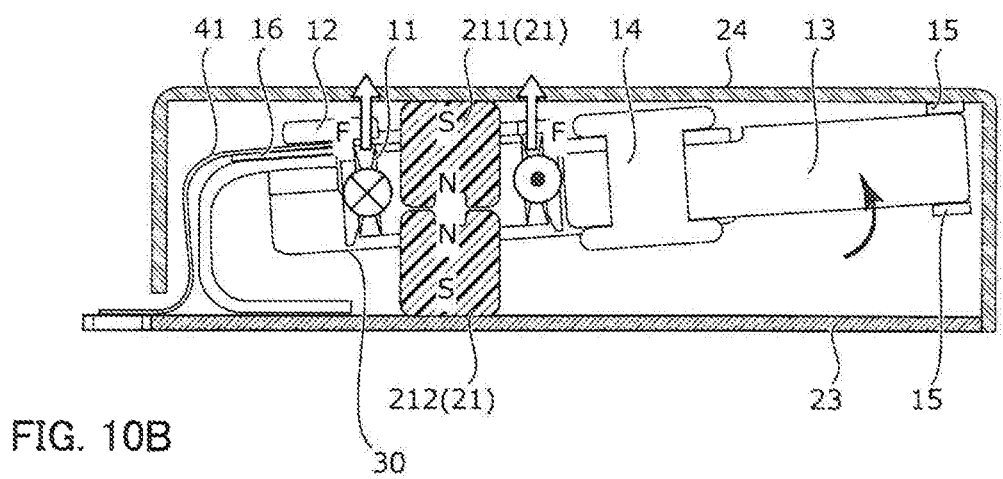
Figure 10C:
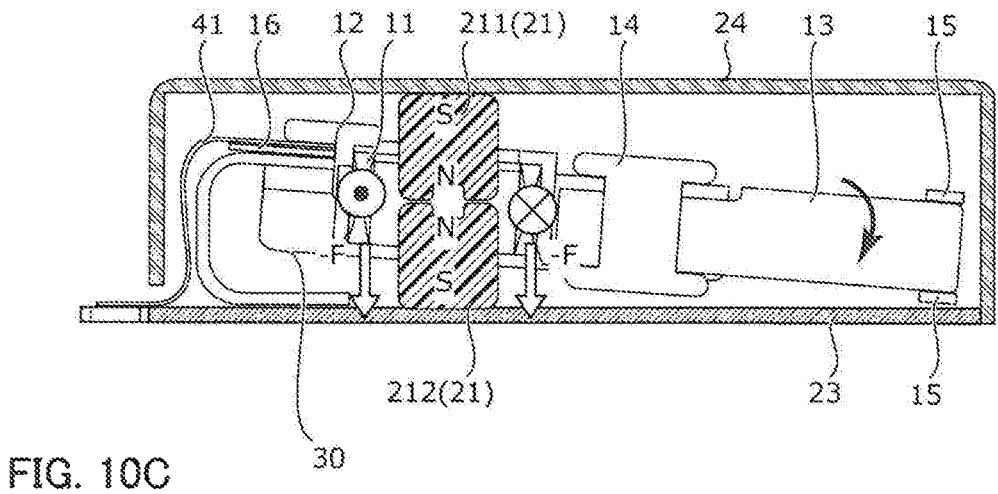

Movable part 10 faces base plate 23 in a non-energized state, and reciprocates in the height direction (Z-direction) to come into contact with and to be separated from base plate 23 when coil 11 is energized (see FIGS. 10B and 10C).

Figure 5A:
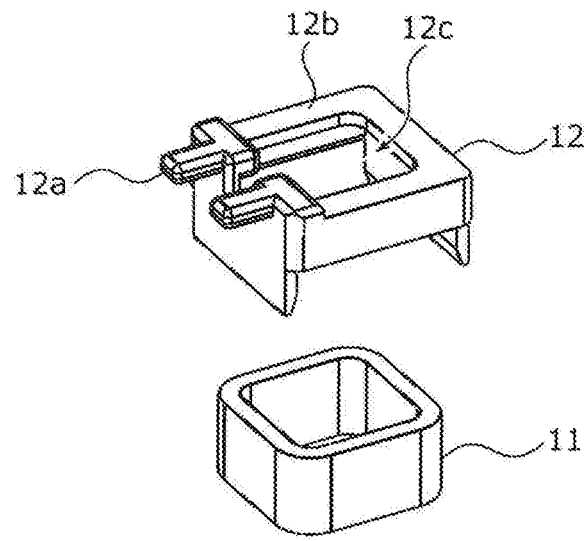
FIGS. 5A and 5B are perspective views of a structure of a coil and a coil holder.
Figure 5B:
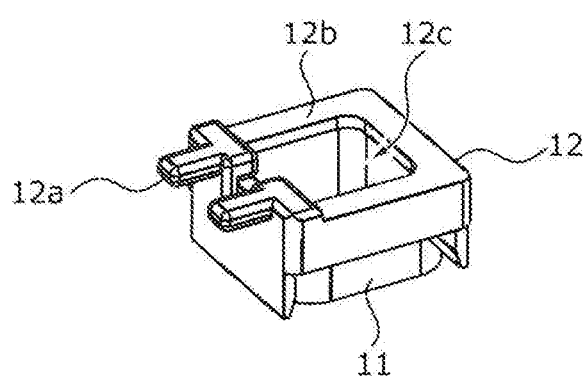

Coil holder 12 is a connecting part for connecting coil 11 to elastic supporting body 30. Coil holder 12 includes coil housing 12b for housing coil 11 and tying parts 12a (see FIGS. 5A and 5B).

In the present embodiment, coil holder 12 is formed from a resin material. Such a material can ensure electrical insulation between coil holder 12 and other metal members (e.g., elastic supporting body 30), thereby improving reliability. In addition, since coil 11 fixed to coil holder 12 is attached to elastic supporting body 30, coil 11 is prevented from deforming and/or becoming loose and the workability and attachment property improve.

A liquid crystal polymer or polyphenylene sulfide resin (PPS resin) is preferable as the resin material, for example. By using the highly-fluid liquid crystal polymer or PPS as the resin material of coil holder 12, the thickness of coil holder 12 can be reduced while securing the strength of coil holder 12, so that space saving can be achieved. Consequently, the number of degrees of freedom for designs of coil 11 and magnet 21 increase, so that it is possible to attempt to increase the vibrational output of vibration actuator 1. Additionally, the liquid crystal polymer and PPS resin are excellent in heat resistance and in mechanical strength and, therefore, the reliability also improves.

Coil housing 12b is formed to have a boxlike shape in the present embodiment, and the outer peripheral surface and upper end surface of coil 11 are to be fixed to the inner surface of coil housing 12b. Note that, opening 12c (see FIGS. 5A and 5B) is formed in the upper surface of coil housing 12b for magnet 21 to be inserted therein.

Since coil housing 12b is boxlike, the mounting position of coil 11 is stabilized and the mounting precision improves. Consequently, the vibrational outputs of vibration actuators 1 as finished products are stabilized. Additionally, the boxlike shape allows easier positioning of coil 11, thereby improving the workability. Moreover, since nothing is interposed between coil 11 and magnet 21, coil 11 and magnet 21 can be brought closer to each other than in the case where a coil holder having a bobbin-like shape as described below is used. This is preferable in terms of increasing the vibrational output of vibration actuator 1.

Tying parts 12a are connecting parts for electrically connecting coil 11 to flexible printed circuit board 41 (hereinafter, referred to as "FPC 41"). Tying parts 12a are formed to protrude outward from coil housing 12b. Tying parts 12a are connected to both ends of coil 11 and to the wiring of FPC 41, for example, by soldering.

Since coil holder 12 includes tying parts 12a, coil 11 is soldered to the same positions of FPC 41 and, thus, the workability is high and steady production becomes possible. Additionally, since the ends of coil 11 are fixed to tying parts 12a, coil 11 can be prevented from becoming loose.

Coil 11 is an air-core coil to be energized when vibration actuator 1 is driven, and coil 11 and magnet 21 are components of the voice coil motor. Coil 11 is formed by winding and fusing self-welding wires. Coil 11 is attached to coil-holder housing 32 of elastic supporting body 30 via coil holder 12.

In the present embodiment, coil 11 has a shape corresponding to the shape of inner peripheral surface of coil holder 12 (has a substantially square shape in this embodiment). With such a shape, coil 11 can be easily attached to coil holder 12. In particular, the outer peripheral surface of coil 11 except its four corners is flat, so that coil 11 can be easily fixed, for example, adhesively to the inner peripheral surface of coil holder 12.

In assembled vibration actuator 1, magnet 21 is disposed radially inside coil 11 with predetermined spacing being provided therebetween. In this case, coil 11 is positioned around a joint portion of first magnet 211 and second magnet 212. The word "radially" in this context means the direction orthogonal to the coil axis (Z-direction). In addition, the term "predetermined spacing" means spacing with respect to first and second magnets 211 and 212 which allows movement (oscillation) of coil 11 in the Z-direction.

The both ends of coil 11 are tied to tying parts 12a of coil holder 12, respectively. Coil 12 is energized via FPC 41 connected to tying parts 12a.

Figure 6A:
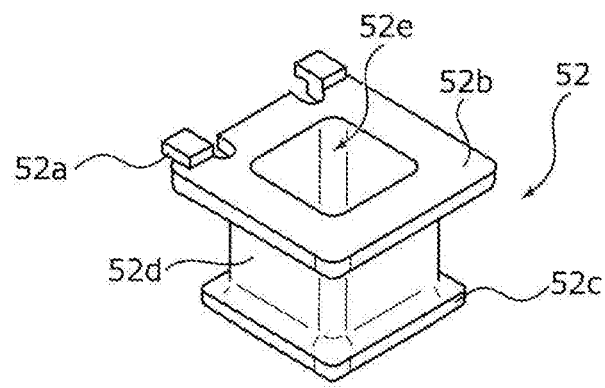
FIGS. 6A to 6C are perspective views of another exemplary structure of the coil and the coil holder.
Figure 6B:
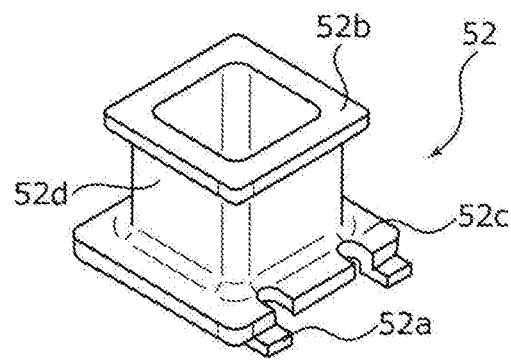
Figure 6C:
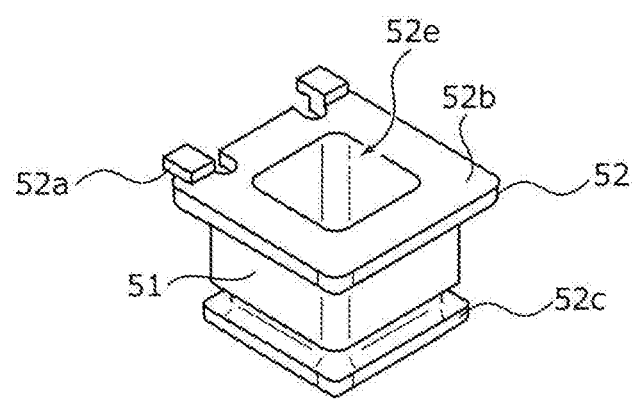

Note that, a structure as illustrated in FIGS. 6A to 6C in which coil holder 52 having a bobbin-like shape including cylinder portion 52d and flanges 52b and 52c disposed on both ends of cylinder portion 52d is used and coil 51 is wound around the outer peripheral surface of cylinder portion 52d may be applied in vibration actuator 1. In coil holder 52, tying parts 52a are disposed on one flange 52b, and magnet 212 is inserted in through hole 52e. In this case, impact resistance improves since wound coil 51 cannot be shifted. Additionally, it is not necessary to use a self-welding wire used for coil 11 of the embodiment, so that cost reduction can be achieved and steps can be automated.

Weight 13 is a weight for increasing the vibrational output of movable part 10. Weight 13 has a substantially rectangular parallelepiped shape and is provided to continue from weight connecting part 31 of elastic supporting body 30 along the extending direction of weight connecting part 31.

Elastic-body connecting part 13a of weight 13 is a part to which elastic supporting body 30 is connected. Elastic-body connecting part 13a is smaller by a thickness of elastic supporting body 30 than a portion of weight 13 which is not covered by elastic supporting body 30, so that a flush outer surface is obtained when elastic-body connecting part 13a and elastic supporting body 30 are joined to each other. Weight connecting part 31 has through hole 31a (hereinafter, referred to as "rivet hole 31a") in which rivet 14 serving as the fixing member is inserted.

It is preferable that weight 13 be formed from a material whose specific gravity (e.g., specific gravity of about 16 to 19) is higher than a material of an electrogalvanized steel sheet (SECC; the specific gravity of the steel sheet is 7.85) or the like. Tungsten may be applicable as the material of weight 13, for example. With such a material, even when the dimensions of external shape of movable part 10 are set in a design or the like, the mass of movable part 10 can be increased comparatively easily and a desired vibrational output can be achieved.

Damper materials 15 are disposed on the upper and lower surfaces of front end of weight 13 (the front end is a portion impinging on base plate 23 and cover 24). Damper materials 15 come into contact with base plate 23 and cover 24 when movable part 10 vibrates (see FIGS. 10B and 10C). Damper materials 15 are formed, for example, from a flexible material, such as an elastomer, rubber, resin, or a porous elastic member (for example, sponge).

With such a material, the impact created by movable part 10 vibrating and coming into contact with base plate 23 or cover 24 is mitigated, so that it is possible to reduce a contact sound or a vibrational noise caused during transmitting the vibration to a user. In addition, since movable part 10 comes into contact with (in particular, impinges on) base plate 23 and cover 24, alternately, via damper materials 15 every time movable part 10 vibrates, the vibrational output is amplified. With this configuration, the user can physically feel a vibrational output greater than an actual vibrational output of movable part 10.

As described above, movable part 10 includes weight 13 to be provided on the free-end side of movable part 10 and weight connecting part 31 to which weight 13 is connected. In the present embodiment, weight 13 is fixed to weight connecting part 31 (elastic supporting body 30) by rivet 14 serving as the fixing member.

Figure 7A:
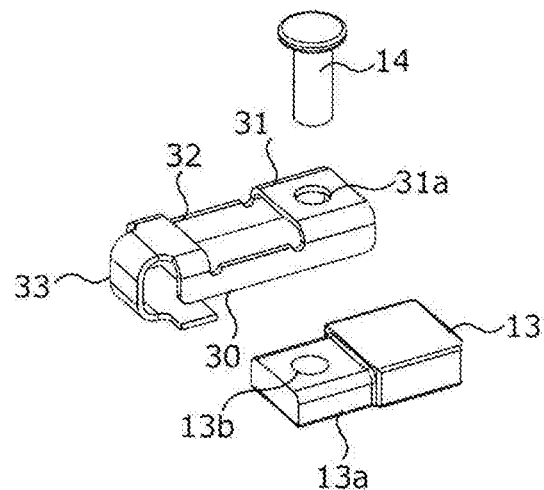
FIGS. 7A to 7C illustrate connecting steps for connection between an elastic supporting body and a weight.
Figure 7B:
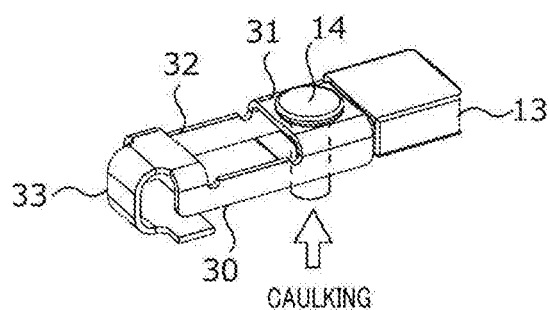
Figure 7C:
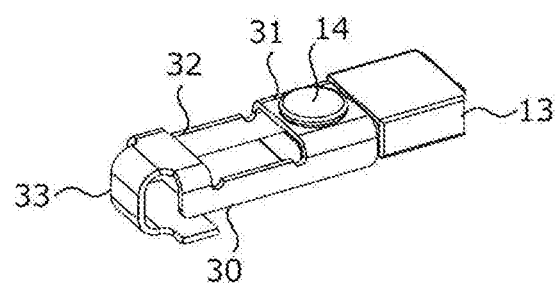

In particular, weight 13 is joined to elastic supporting body 30 in accordance with connecting steps illustrated in FIGS. 7A to 7C. That is, to begin with, elastic-body connecting part 13a of weight 13 is positioned to and fitted in weight connecting part 31 of elastic supporting body 30 such that rivet holes (through holes) 31a and 13b are aligned to each other as illustrated in FIG. 7A. Weight connecting part 31 and elastic-body connecting part 13a may be bonded, at their contacting surfaces, to each other by a thermosetting adhesive.

Next, rivet 14 is inserted in rivet holes (through holes) 31a and 13b from the side of elastic supporting body 30, and a leading end (an end opposite to a head portion) of rivet 14 is caulked. At this time, the caulked portion can be finely finished, for example, by applying a high spin caulking technique. Elastic supporting body 30 is joined to weight 13 in the above steps (see FIG. 7C).

By using rivet 14 as the fixing member, elastic supporting body 30 and weight 13 are mechanically fixed to each other and, thus, the reliability of vibration actuator 1 improves. Additionally, the production can be performed using simple equipment and in simple steps, so that the takt time and the production cost can be reduced and, accordingly, productivity improves.

In a case where weight 13 is formed from a material including tungsten as its main component and elastic supporting body 30 is formed from a stainless material as in the present embodiment, there is a possibility that the number of degrees of freedom for designing may decrease if weight 13 and elastic supporting body 30 is fixed to each other by welding. This is because their melting points differ from each other (tungsten: 3422 degrees Celsius, stainless material: approximately 1400 degrees Celsius) and, consequently, a greater area is required for fixation by welding. In contrast, with the fixation by rivet 14, rivet holes (through holes) 13b and 31a in which rivet 14 with a predetermined strength can be inserted only have to be formed and, therefore, the number of degrees of freedom for designing is high.

Rivet 14 is formed from a copper-based material (copper or copper alloy) or a stainless material, for example. The workability improves when rivet 14 is formed from the copper-based material since the material can be extended easily and it is thus easy to caulk the leading end of rivet 14. Additionally, the copper-based material has a higher strength and, therefore, also improves the reliability. Moreover, the copper-based material is easily available and, accordingly, cost reduction can be achieved. In addition, there is no risk that the copper-based material obstructs the performance of vibration actuator 1 since the copper-based material is non-magnetic and, accordingly, does not affect the magnetic circuit of vibration actuator 1. Furthermore, the copper-based material is preferable in order to increase the mass of movable part 10 since the copper-based material has a higher specific gravity than the stainless material. On the other hand, in a case where rivet 14 is formed from the stainless material, the strength of a fixed portion becomes higher than in the case of the copper-based material and, accordingly, the reliability improves.

Fixing part 20 includes magnet 21, magnet holder 22, base plate 23, and cover 24.

Base plate 23 is platelike (has the shape of a rectangular plate in the present embodiment), and forms the bottom face of vibration actuator 1. Cover 24 has the shape of a box (has the shape of a rectangular box in the present embodiment) corresponding to base plate 23, and forms the upper surface and the side surfaces of vibration actuator 1. The case of vibration actuator 1 is formed by base plate 23 and cover 24 attached to base plate 23. Although the external shape and dimensions of vibration actuator 1 are not particularly limited, vibration actuator 1 in the present embodiment assumes a rectangular parallelepiped shape whose length is the greatest and whose height is the smallest among the width (X-direction), length (Y-direction), and height (Z-direction). Components including movable part 10 are housed in the space defined by base plate 23 and cover 24.

It is preferable that base plate 23 and cover 24 be formed from a conductive material. With such a material, base plate 23 and cover 24 function as a yoke which, together with magnet 21, forms the magnetic circuit while functioning as electromagnetic shields.

Magnet 21 is composed of two magnets 211 and 212. One magnet 211 of magnets 211 and 212 which is positioned on the upper side (on the side of cover 24) in assembled vibration actuator 1 is referred to as first magnet 211, and the other magnet 212 positioned on the lower side (on the side of base plate 23) is referred to as second magnet 212.

Figure 8A:
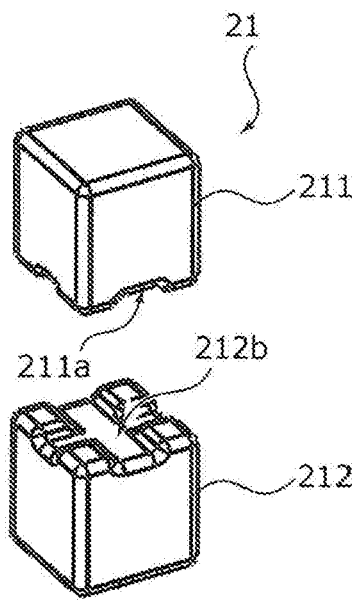
FIGS. 8A and 8B are perspective views of an example of depressed portions of a magnet.
Figure 8B:
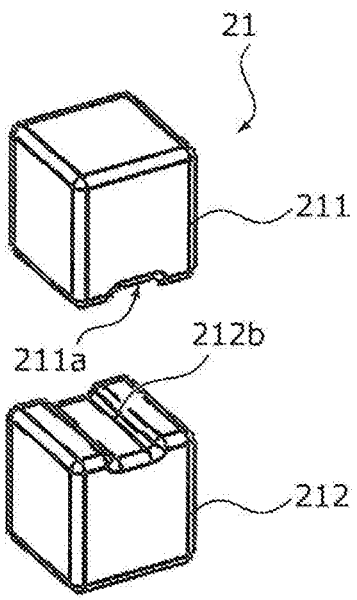

First magnet 211 and second magnet 212 have substantially the same shape of a column (the rectangular parallelepiped shape in the present embodiment), and they are joined such that their magnetization directions are opposite to each other. That is, first magnet 211 and second magnet 22 are disposed and joined such that their same magnetic poles face each other. In this embodiment, first magnet 211 and second magnet 212 are magnetized such that their N poles are respectively on the joining-surface sides and their S poles are respectively on the sides of cover 24 and base plate 23. Note that, the term "substantially the same" means that, while the external shapes of first and second magnets 211 and 212 are the same, the structures of details (for example, depressed portions 211a and 212a formed in the joining surfaces (see FIGS. 8A and 8B)) may differ from each other.

Coil 11 is disposed at a height the same as the height of the joint portion of first and second magnets 211 and 212 in assembled vibration actuator 1. In the case where first and second magnets 211 and 212 are magnetized such that the N poles are respectively on the joining-surface sides and the S poles are respectively on the sides of cover 24 and base plate 23, magnetic fluxes emitted from the middle portion (joint portion) of magnet 21 in the Z-direction and incident on the both ends of magnet 21 in the Z-direction are formed. Therefore, the magnetic fluxes cross coil 11 from the inside to the outside of coil 11 at every place of coil 11, so that a Lorentz force acts in the same direction when coil 11 is energized. For example, when coil 11 is energized as illustrated in FIG. 10B, the Lorentz force acts on coil 11 in the upward direction, and when coil 11 is energized as illustrated in FIG. 10C, the Lorentz force acts on coil 11 in the downward direction.

First magnet 211 and second magnet 212 are joined to each other by an adhesive, for example. That is, there is an adhesive layer (whose reference numeral is omitted) interposed between first magnet 211 and second magnet 212. An adhesive consisting of an ultraviolet-curable resin, thermosetting resin, or anaerobically-curable resin is applicable as the adhesive, for example. Ultraviolet-curable adhesives (based on acrylic resins or epoxy resins) can be cured by ultraviolet irradiation for a short time and, therefore, can reduce the takt time and steps. Meanwhile, thermosetting adhesives (based on epoxy resins or acrylic resins) or anaerobically-curable adhesives (based on acrylic resins) can increase the bonding strength.

The thermosetting adhesives based on epoxy resins are particularly preferable. In the case of the ultraviolet-curable adhesives, there is a risk that the curing is insufficient since the central portion of the adhesive layer is hard to be irradiated with ultraviolet light. Similarly, in the case of the anaerobically-curable adhesives, there is a risk that the curing is insufficient since magnet 21 is small and a portion of magnet 21 which is not in contact with air is small. In contrast, the thermosetting adhesives based on the epoxy resins can be certainly cured by heating and, therefore, steady producing steps are achieved and the producibility and reliability improve.

In the present embodiment, first and second magnets 211 and 212 include depressed portions 211a and 212a in their joining surfaces, respectively. With this configuration, depressed portions 211a and 212a serve as a resin pit, thereby making an adhesion area greater to increase the adhesive strength. Accordingly, the impact resistance is improved and the reliability increases. Additionally, adhesive oozing is reduced and, thus, the workability is also improved. Moreover, depressed portions 211a and 212a can also be used as markings for identifying the magnetization directions of first and second magnets 211 and 212.

In the case where first and second magnets 211 and 212 are joined to each other by an adhesive such that their magnetization directions are opposite to each other, there are possibilities that an excessive amount of applied adhesive results in a larger gap between the magnets and, accordingly, affects the vibrational characteristics, or an insufficient amount of applied adhesive cannot result in an enough bonding strength and, accordingly, the magnets are damaged during vibration. In the present embodiment, such problems are solved by forming depressed portions 211a and 212a in the joining surfaces of first and second magnets 211 and 212, respectively.

Note that, only at least one of first and second magnets 211 and 212 need to have depressed portion 211a or 212a, and depressed portions 211a and 212a may have different shapes.

It is preferable that depressed portions 211a and 212a be cross-shaped (see FIG. 8A) or linear (see FIG. 8B), for example. When depressed portions 211a and 212a is cross-shaped, depressed portions 211a and 212a collects a larger amount of adhesive and, thus, the adhesive strength can be increased effectively. Meanwhile, when depressed portions 211a and 212a is linear, depressed portions 211a and 212a can be readily machined and it is thus possible to achieve the stable shape so as to reduce individual variations and to provide magnet 21 of stable quality.

Magnet holder 22 is a part for positioning magnet 21, and has the shape of a flat frame (rectangular frame in the present embodiment) that surrounds second magnet 212. Magnet holder 22 is formed from non-magnetic stainless steel, for example. While magnet holder 22 may be formed from any material such as a metal, resin, or the like, it is preferable that magnet holder 22 be of a non-magnetic material in order not to affect the magnetic fluxes emitted from magnet 21 (in particular, from second magnet 212).

Second magnet 212 and magnet holder 22 are fixed to base plate 23 at a predetermined position by a thermosetting adhesive, such as an epoxy resin, for example. Additionally, after magnet 21 is inserted in movable part 10 and cover 24 is attached, first magnet 211 is fixed to cover 24 at a predetermined position by injecting an adhesive from an injection hole (whose reference numeral is omitted) of cover 24, for example.

FPC 41 to be connected to tying parts 12a of coil holder 12 extends along plate spring part 33 of elastic supporting body 30, and is drawn out to the outside of cover 24. One end of FPC 41 is held between tying parts 12a and elastic supporting body 30. FPC 41 deforms following the vibration of movable part 10.

In the present embodiment, elastic member 16 is interposed between FPC 41 and elastic supporting body 30. Elastic member 16 is formed from an elastic adhesive or elastic adhesive tape, for example. With this configuration, FPC 41 and elastic supporting body 30 are elastically fixed to each other, so that the impact created during vibration is absorbed by elastic member 16. Consequently, it is possible to prevent destruction of the electrical connection (in particular, disconnection of windings and/or a crack or damage in solder) in tying parts 12a caused due to the impact during vibration of movable part 10, so that the reliability of vibration actuator 1 improves.

Figure 9:
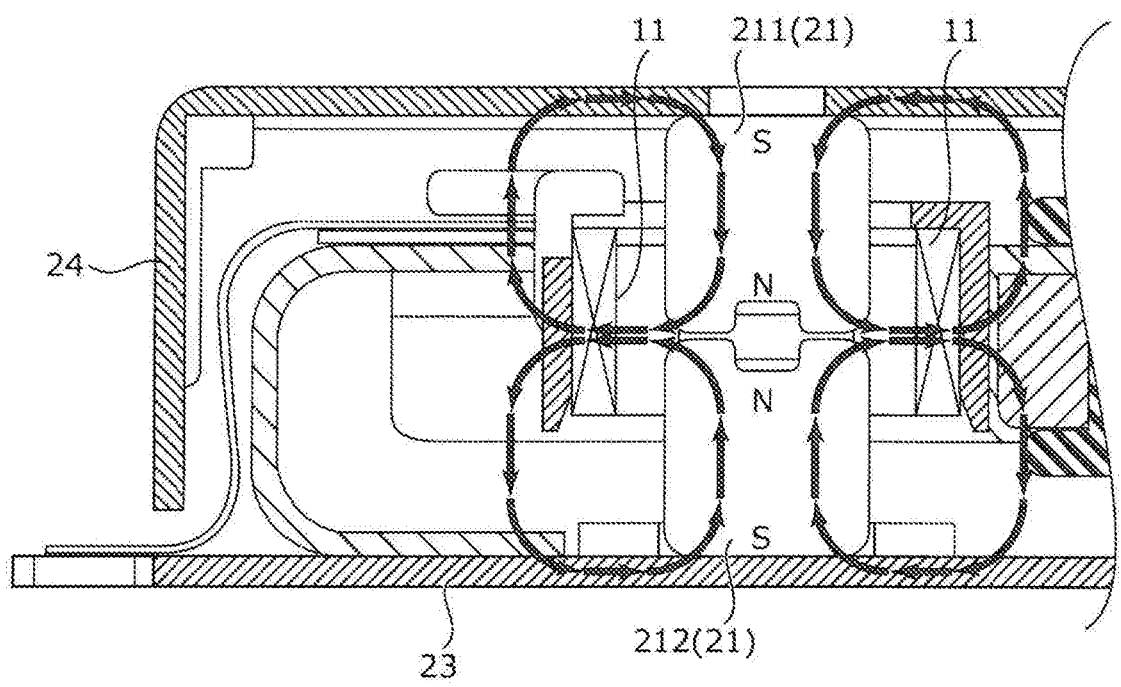
FIG. 9 illustrates a magnetic circuit of the vibration actuator.

FIG. 9 illustrates the magnetic circuit of vibration actuator 1. FIGS. 10A to 10C are longitudinal sectional views illustrating operation of movable part 10. FIGS. 10A to 10C respectively illustrate a state of movable part 10 where movable part 10 is not energized (reference state), a state of movable part 10 where coil 11 is energized with a current being clockwise as seen from above, and a state of movable part 10 where coil 11 is energized with a current being counterclockwise as seen from above.

In vibration actuator 1, movable part 10 is disposed to be supported at its one end by plate spring part 33 of elastic supporting body 30 between base plate 23 and cover 24 of fixing part 20. In addition, magnet 21 is disposed radially inside coil 11 of movable part 10, and first and second magnets 211 and 212 are joined to each other such that their pole faces of the same polarity (N pole in FIGS. 9 and 10A to 10C) face each other.

Movable part 10 reciprocates in Z-direction (i.e., in a direction in which movable part 10 comes into contact with and is separated from base plate 23 and cover 24) by energizing coil 11 via FPC 41 from a power supplying part (not illustrated). In particular, the other end of movable part 10 oscillates. In this way, the vibrational output of vibration actuator 1 is transmitted to the user of the portable device provided with vibration actuator 1.

The magnetic circuit illustrated in FIG. 9 is formed in vibration actuator 1. Additionally, in vibration actuator 1, coil 11 is disposed to be perpendicular to the magnetic fluxes from first and second magnets 211 and 212. Accordingly, when energization is performed as illustrated in FIG. 10B, Lorentz force F is generated in coil 11 by interaction between the magnetic field of magnet 21 and the current flowing through coil 11 in accordance with Fleming's left hand rule. The direction of Lorentz force F is a direction (the plus side in the Z-direction in FIG. 10B) that is orthogonal to the direction of the magnetic field and to the direction of the current flowing through coil 11. With this Lorentz force F serving as a thrust, movable part 10 oscillates. To be more specific, since movable part 10 is supported at its one end by elastic supporting body 30 (plate spring part 33), the other end (i.e., weight 13) of movable part 10 moves on the plus side in the Z-direction. Then, movable part 10 comes into contact with (specifically, impinges) cover 24 via damper material 15 disposed on the front end of weight 13.

Moreover, when the energizing direction in coil 11 is switched to the opposite direction and the energization is performed as illustrated in FIG. 10C, opposite Lorentz force −F (toward the minus side in the Z-direction) is generated. With this Lorentz force −F serving as a thrust, the movable part oscillates. Specifically, the other end (i.e., weight 13) of movable part 10 moves on the minus side in the Z-direction, and comes into contact with (specifically, impinges) base plate 23 via damper material 15 disposed on the front end of weight 13.

In vibration actuator 1, movable part 10 is supported to be movable by plate spring part 33 fixed at its one end to movable part 10 and fixed at its other end to fixing part 20. This configuration provides a simple supporting structure, thereby allowing a simpler design. This configuration also makes it possible to achieve the space saving, so that the miniaturization of vibration actuator 1 can be achieved.

Additionally, in vibration actuator 1, coil 11 and magnet 21 are disposed on the base-end side of movable part 10 (the side on which plate spring part 33 is joined), and weight 13 is disposed on the front-end side of movable part 10. That is, the magnetic circuit for generating a driving torque of movable part 10 is disposed on the side of the fulcrum for oscillation, and weight 13 is disposed on the side of the front end of movable part 10 at which the displacement range during oscillation is the largest. With this configuration, in comparison with a configuration in which coil 11 and magnet 21 are disposed on the front-end side of movable part 10, the proportion of weight 13 disposed on the front-end side can be larger and the rotational moment (mass in a rotating system) given to movable part 10 can be greater, so that a higher vibrational output can be achieved. Therefore, it is possible to deal with even a case where the height in the Z-direction is limited for height reduction of vibration actuator 1 and the motion range (vibration amount) of movable part 10 is thus restricted.

Moreover, in contrast to a vibration actuator in which a movable part vibrates while sliding on a fixing part, movable part 10 vibrates without sliding on a part of fixing part 20 and, therefore, attenuation in thrust due to frictional resistance of movable part 10 sliding on fixing part 20 is not caused during vibration, so that more preferable vibration can be achieved.

In the present embodiment, vibration actuator 1 is driven by an AC wave input to coil 11 via FPC 41 from the power supplying part (not illustrated). That is, the energizing direction of coil 11 is switched periodically and thrust F directed toward the plus side in the Z-direction and thrust −F directed toward the minus side in the Z-direction act on movable part 10 by turns. Thus, the other end of movable part 10 vibrates in a circular arc within the YZ plane.

Hereinbelow, brief descriptions of the driving principle of vibration actuator 1 will be given. In vibration actuator 1 of the embodiment of the present invention, movable part 10 vibrates with respect to fixing part 20 at resonance frequency $f_r$ [Hz] computed by the following Equation 1 in which J [kg·m²] denotes the moment of inertia of movable part 10 and $K_{sp}$ denotes the spring constant of plate spring part 33 in the torsional direction.

(Equation 1)

$$f_r = \frac{1}{2\pi}\sqrt{\frac{K_{sp}}{J}} \quad [1] \quad (1)$$

$f_r$: Resonance frequency [Hz]
J: Moment of inertia [kg·m²]
$K_{sp}$: Spring constant [N·m/rad]

Since movable part 10 is a mass in a vibration model of a spring-mass system, movable part 10 is brought into a resonance state when the AC wave of a frequency equal to resonance frequency $f_r$ of movable part 10 is input to coil 11. That is, movable part 10 can be efficiently vibrated by inputting the AC wave of a frequency being substantially equal to resonance frequency $f_r$ of movable part 10 to coil 11 from the power supplying part.

The equation of motion and the circuit equation representing the driving principle of vibration actuator 1 are shown below. Vibration actuator 1 is driven based on the equation of motion represented by the following Equation 2 and on the circuit equation represented by the following Equation 3.

(Equation 2)

$$J\frac{d^2\theta(t)}{dt^2} = K_t i(t) - K_{sp}\theta(t) - D\frac{d\theta(t)}{dt} \quad [2] \quad (2)$$

J: Moment of inertia [kg·m²]
θ(t): Angle [rad]
$K_t$: Torque constant [N·m/A]
i(t): Current [A]
$K_{sp}$: Spring constant [N·m/rad]
D: Damping coefficient [N·m/(rad/s)]

(Equation 3)

$$e(t) = R_i(t) + L\frac{di(t)}{dt} + K_e\frac{d\theta(t)}{dt} \quad [3] \quad (3)$$

e(t): Voltage [V]
R: Resistance [Ω]
L: Inductance [H]
$K_e$: Counter electromotive force constant [V/(rad/s)]

That is, moment of inertia J [kg·m²], angle of rotation θ(t) [rad], torque constant $K_t$ [N·m/A], current i(t) [A], spring constant $K_{sp}$ [N·m/rad], damping coefficient D [N·m/(rad/s)], and the like of movable part 10 in vibration actuator 1 may be changed appropriately as long as Equation 2 is satisfied. Voltage e(t) [V], resistance R [Ω], inductance L [H], and counter electromotive force constant $K_e$ [V/(rad/s)] may also be changed appropriately as long as Equation 3 is satisfied.

As described above, in vibration actuator 1, a great vibrational output can be obtained efficiently when the energization of coil 11 is performed using the AC wave corresponding to resonance frequency $f_r$ determined by moment of inertia J of movable part 10 and spring constant $K_{sp}$ of plate spring part 33.

Figure 11A:
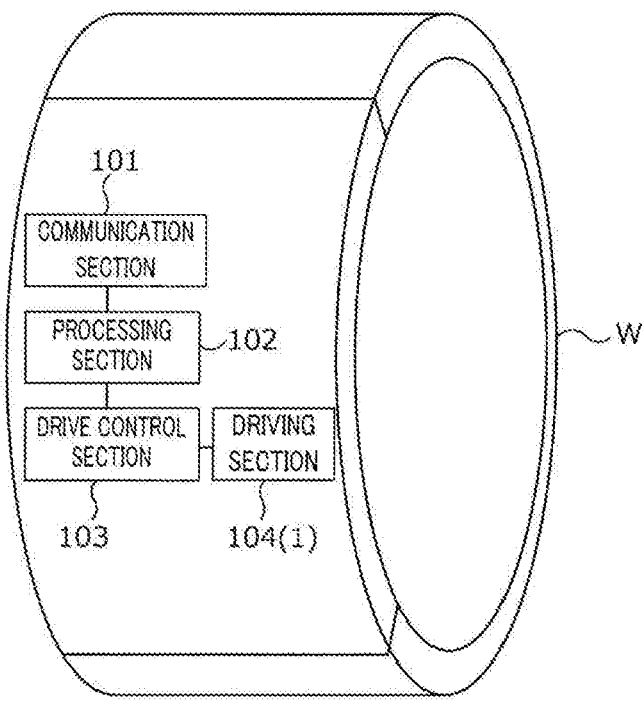
FIGS. 11A and 11B illustrate exemplary mounting configurations of the vibration actuator.
Figure 11B:
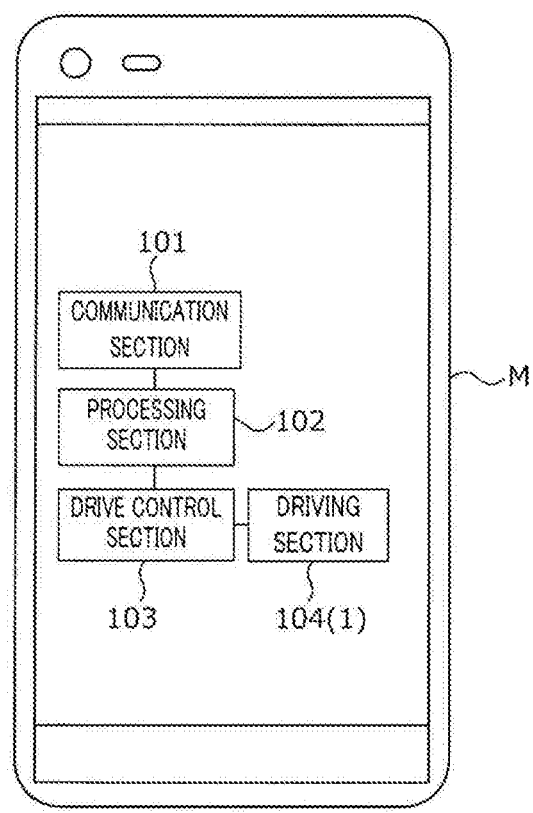

FIGS. 11A and 11B illustrate exemplary mounting configurations of vibration actuator 1. FIG. 11A illustrates an example of vibration actuator 1 mounted in wearable terminal W, and FIG. 11B illustrates another example of vibration actuator 1 mounted in mobile terminal M.

Wearable terminal W is worn for use by a user. Wearable terminal W has the shape of a ring in this embodiment, and is put on a finger of the user. Wearable terminal W is wirelessly connected to an information communication terminal (for example, mobile phone). Wearable terminal W notifies the user of an incoming call and/or incoming mail of the information communication terminal by vibration. Note that, wearable terminal W may be provided with functions other than incoming call notification (for example, a function of input operation to the information communication terminal).

Mobile terminal M is a portable communication terminal, such as a mobile phone or smartphone, for example. Mobile terminal M vibrates to notify a user of an incoming call from an external communication device and also to realize functions of mobile terminal M (for example, functions of giving an operational feeling and/or realism).

As illustrated in FIGS. 11A and 11B, each of wearable terminal W and mobile terminal M includes communication section 101, processing section 102, drive control section 103, and driving section 104. Vibration actuator 1 is applied as driving section 104.

In wearable terminal W and mobile terminal M, vibration actuator 1 is mounted such that the XY face of vibration actuator 1 is parallel to the main face of wearable terminal W or mobile terminal M. Specifically, as for wearable terminal W, vibration actuator 1 is mounted such that the XY face is parallel to the inner peripheral surface of the case of wearable terminal W. As for mobile terminal M, vibration actuator 1 is mounted such that the XY face is parallel to the display screen (touch panel face) of mobile terminal M. With these configurations, vibration perpendicular to the main face (serving as the vibration transmitting surface) of wearable terminal W or mobile terminal M is transmitted to the user.

Communication section 101 is wirelessly connected to an external communication device, receives a signal from the external communication device, and outputs the signal to processing section 102. In the case of wearable terminal W, the external communication device is an information communication terminal such as a mobile phone, smartphone, or portable game terminal, for example, and wearable terminal W communicates with such an external communication device in accordance with a short-distance radio communication standard, such as Bluetooth (registered trademark). In the case of mobile terminal W, the external communication device is a base station, for example, and mobile terminal W communicates with such an external communication device in accordance with mobile telecommunications standards.

Processing section 102 converts input signals into driving signals for driving driving section 104 (vibration actuator 1) by a conversion circuit section (not illustrated), and outputs the driving signals to drive control section 103. Note that, in mobile terminal M, processing section 102 generates driving signals based not only on signals input from communication section 101 but also on signals input from various function sections (not illustrated) (e.g., an operation section such as a touch panel or the like).

Drive control section 103 is connected to driving section 104 (to FPC 41 of vibration actuator 1), and is a section in which a circuit for driving driving section 104 is mounted. Drive control section 103 provides driving section 104 with the driving signals.

Driving section 104 is driven based on the driving signals from drive control section 103. Specifically, in vibration actuator 1 applied as driving section 104, movable part 10 vibrates perpendicularly to the main surface of wearable terminal W or mobile terminal M. Since movable part 10 comes into contact with base plate 23 or cover 24 every time movable part 10 vibrates, the impact on base plate 23 or cover 24 created by the vibration of movable part 10 is transmitted directly to a user as vibration. Since the vibration perpendicular to the body surface of the user is transmitted to the body surface of the user in contact with wearable terminal W or mobile terminal M, sufficient physically-felt vibration can be given to the user.

As described above, vibration actuator 1 according to the present embodiment includes: movable part 10 including coil 11; fixing part 20 including magnet 21; and plate spring part (elastic supporting part) 33 configured to support movable part 10 such that movable part 10 is movable to fixing part 20. Movable part 10 is configured to reciprocate with respect to fixing part 20 in a vibrating direction by interaction between coil 11 and magnet 21. Magnet 21 is disposed to be radially inwardly spaced apart from coil 11. Plate spring part 33 is fixed to fixing part 20 at one end of plate spring part 33 and to movable part 10 at the other end of plate spring part 33. Plate spring part 33 has a structure in which movable part 10 is cantilevered. Coil 11 in a state of being fixed to resin coil holder 12 is integrated in movable part 10 in a state where coil 11.

According to vibration actuator 1, sufficient physically-felt vibration can be given to a user without enlargement of vibration actuator 1. In addition, coil holder 12 is formed from a resin material, so that it is possible to ensure electrical insulation between coil holder 12 and other metal members (e.g., elastic supporting body 30), so as to improve the reliability. In addition, since coil 11 fixed to coil holder 12 is attached to elastic supporting body 30, coil 11 is prevented from deforming and/or becoming loose and the workability and attachment property improve.

While the invention made by the present inventor has been specifically described based on the preferred embodiment, it is not intended to limit the present invention to the above-mentioned preferred embodiment but the present invention may be further modified within the scope and spirit of the invention defined by the appended claims.

By way of an example, although the embodiment has been described in relation to the case where the rivet as a separate member is applied as the fixing member for fixing the weight to the weight connecting part, the embodiment is not limited to the rivet, and an upright protrusion formed as an integral piece of one of the weight and the weight connecting part may be applied as the fixing member and the weight may be fixed to the weight connecting part by inserting this upright protrusion in a through hole formed in the other one of the weight and the weight connecting part and by caulking the leading end of the protrusion.

Additionally, for example, it is also preferable that the vibration actuator according to the present invention be applied to portable devices other than wearable terminal W and mobile terminal M as described in the embodiment (e.g., personal digital assistants such as tablet PCs, portable game terminals, and a controller (game pad) of stationary game machines).

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

The invention claimed is:

1. A vibration actuator, comprising:
a movable part including one of a coil or a magnet;
a fixing part including the other one of the coil or the magnet; and
an elastic supporting part configured to support the movable part such that the movable part is movable to the fixing part, the movable part being configured to reciprocate with respect to the fixing part in a vibrating direction by interaction between the coil and the magnet, wherein:
the magnet is disposed to be radially inwardly spaced apart from the coil,
the elastic supporting part is fixed to the fixing part at one end of the elastic supporting part and to the movable part at the other end of the elastic supporting part, the elastic supporting part having a structure for cantilevering the movable part, and
the coil in a state of being fixed to a resin coil holder is integrated in the movable part or the fixing part.

2. The vibration actuator according to claim 1, wherein the resin coil holder is formed from a liquid crystal polymer or polyphenylene sulfide resin.

3. The vibration actuator according to claim 1, wherein the resin coil holder has a shape of a box to which an outer peripheral surface and at least one end surface of the coil are fixed.

4. The vibration actuator according to claim 1, wherein the resin coil holder has a shape of a bobbin around which the coil is wound.

5. The vibration actuator according to claim 1, wherein the resin coil holder includes tying parts to which both ends of the coil are respectively connected.

6. The vibration actuator according to claim 5, further comprising, a flexible printed circuit board to be electrically connected to the tying parts, wherein
the flexible printed circuit board is fixed to the elastic supporting part via an elastic member.

7. A portable device in which the vibration actuator according to claim 1 is mounted.

* * * * *